(12) United States Patent
Ferre et al.

(10) Patent No.: US 10,375,171 B2
(45) Date of Patent: Aug. 6, 2019

(54) ITERATIVE LEARNING FOR RELIABLE SENSOR SOURCING SYSTEMS

(71) Applicant: International Business Machines Corporation, Armonk, NY (US)

(72) Inventors: Wilfredo Ferre, Le Mesnil le Roi (FR); Dimitri Kanevsky, Ossining, NY (US); Peter K. Malkin, Yorktown Heights, NY (US); Marc P. Yvon, Antony (FR)

(73) Assignee: International Business Machines Corporation, Armonk, NY (US)

( * ) Notice: Subject to any disclaimer, the term of this patent is extended or adjusted under 35 U.S.C. 154(b) by 767 days.

(21) Appl. No.: 13/929,255

(22) Filed: Jun. 27, 2013

(65) Prior Publication Data
US 2015/0005901 A1 Jan. 1, 2015

(51) Int. Cl.
*H04L 29/08* (2006.01)
*H04L 12/24* (2006.01)
*G05B 15/02* (2006.01)

(52) U.S. Cl.
CPC .......... *H04L 67/12* (2013.01); *H04L 41/0856* (2013.01); *H04L 41/12* (2013.01); *G05B 15/02* (2013.01); *H04L 67/303* (2013.01)

(58) Field of Classification Search
CPC .......... G06N 5/00; G06N 99/00; H04L 67/12; H04L 29/0621
See application file for complete search history.

(56) References Cited

U.S. PATENT DOCUMENTS

| 6,238,337 | B1 | 5/2001 | Kambhatla et al. |
| 6,418,423 | B1 | 7/2002 | Kambhatla et al. |
| 6,862,454 | B1 | 3/2005 | Kanevsky et al. |
| 8,195,498 | B2 | 6/2012 | Vojnovic et al. |
| 2003/0061185 | A1 | 3/2003 | Lee |
| 2004/0217869 | A1* | 11/2004 | Bouchard ............ B60R 25/102 340/573.4 |

(Continued)

FOREIGN PATENT DOCUMENTS

| CN | 101257514 A | 9/2008 |
| CN | 102195842 A | 9/2011 |

(Continued)

OTHER PUBLICATIONS

D. Guinard et al., "Interacting with the SOA-Based Internet of Things: Discovery, Query, Selection, and On-Demand Provisioning of Web Services", IEEE Trans. on Services Computing, vol. 3, No. 3, Jul.-Sep. 2010, pp. 223-235.*

(Continued)

*Primary Examiner* — Vincent Gonzales
(74) *Attorney, Agent, or Firm* — Scully, Scott, Murphy & Presser, P.C.; Rahan Uddin

(57) ABSTRACT

Providing a registry of sensor devices may comprise obtaining a device, determining one or more information types returned by the device, determining one or more communication protocols used by the device for transmitting information, determining one or more encoding schemes used by the device to format the information, adding the device to the registry of sensor devices including at least the one or more information types, the one or more communication protocols and the one or more encoding schemes, and allowing access to the registry of sensor devices.

8 Claims, 10 Drawing Sheets

(56) References Cited

U.S. PATENT DOCUMENTS

| | | | |
|---|---|---|---|
| 2007/0276776 A1 | 11/2007 | Sagher | |
| 2008/0201277 A1 | 8/2008 | Ozdemir | |
| 2008/0267220 A1 | 10/2008 | Saad | |
| 2009/0204232 A1 | 8/2009 | Guru | |
| 2011/0246148 A1 | 10/2011 | Gupta et al. | |
| 2011/0285591 A1 | 11/2011 | Wong | |
| 2013/0013540 A1 | 1/2013 | He | |
| 2013/0063581 A1* | 3/2013 | Komatsu | G06K 9/00926 348/77 |
| 2013/0226492 A1 | 8/2013 | Moiseev et al. | |
| 2013/0293217 A1* | 11/2013 | Moiseev | G05B 9/03 324/76.77 |
| 2014/0266684 A1* | 9/2014 | Poder | G08B 25/003 340/521 |

FOREIGN PATENT DOCUMENTS

| | | |
|---|---|---|
| CN | 102523240 A | 6/2012 |
| CN | 102948117 A | 2/2013 |
| CN | 103118105 A | 5/2013 |
| WO | 2013/054237 A1 | 4/2013 |

OTHER PUBLICATIONS

Yu, B. and Sycara, K., "Learning the Quality of Sensor Data in Distributed Decision Fusion", Information Fusion, 2006 9th International Conference on. IEEE, 2006, 8 pages.*

R. Loveland and E. Rosten, "Acquisition and registration of aerial video imagery of urban traffic", Los Alamos Nat'l Lab., LA-UR-08-4660, 1998, 12 pages.*

Hakoura et al., Data Aggregation in Wireless Sensor Networks: A Comparison of Collection Tree Protocols and Gossip Algorithms, 25th IEEE Canadian Conference on Electrical and Computer Engineering (CCECE), Apr. 29, 2012-May 2, 2012, pp. 1-4.

Chen et al., A Load-Balanced Data Aggregation Scheduling for Duty-cycled Wireless Sensor Networks, IEEE 4th International Conference on Cloud Computing Technology and Science, Dec. 3-6, 2012, pp. 888-893.

Karger et al., Iterative Learning for Reliable Crowdsourcing Systems,Department of Electrical Engineering and Computer Science, Massachusetts Institute of Technology, Cambridge, MA 02139, Dec. 12-15, 2011, pp. 1953-1961,Granada Spain.

Anonymous, A Centralized Database Registry for Sensor Devices for Providing Requested Data, Jul. 6, 2012, pp. 1-2, IP.com No. IPCOM000219565D.

Office Action dated May 6, 2016 received in U.S. Appl. No. 13/958,797, 15 pages.

Office Action dated Sep. 13, 2016 received in U.S. Appl. No. 13/958,797, 19 pages.

Office Action dated Feb. 2, 2017 received in U.S. Appl. No. 13/958,797, 17 pages.

Office Action dated May 2, 2017 received in U.S. Appl. No. 13/958,797, 22 pages.

Final Office Action dated Sep. 12, 2017 received in U.S. Appl. No. 13/958,797, 26 pages.

Office Action dated Nov. 26, 2018 received in U.S. Appl. No. 13/958,797, 22 pages.

* cited by examiner

ITERATIVE LEARNING FOR RELIABLE SENSOR SOURCING SYSTEMS

FIELD

The present application relates generally to computers, and computer applications, device sensors, and more particularly to iterative learning for reliable sensor sourcing systems.

BACKGROUND

Although there is a wide spread of Internet devices and connected sensors, accessing the right devices that fit one's needs and analyzing the data returned from those devices do not present an easy task. In addition, developing a confidence or quality rating for each source of data is an important factor in producing refined and reliable analytics. Currently, such appraisals are done either manually or at best through declarative means, such as the specifications for a sensor provided by its manufacturer. Those methods may be insufficient to face the challenge posed by the current smart big data usage.

BRIEF SUMMARY

A method for providing a registry of sensor devices, in one aspect, may comprise obtaining a device. The method may also comprise determining one or more information types returned by the device. The method may further comprise determining one or more communication protocols used by the device for transmitting information. The method may further comprise determining one or more encoding schemes used by the device to format the information. The method may also comprise adding the device to the registry of sensor devices including at least the one or more information types returned by the device, the one or more communication protocols and the one or more encoding schemes. The method may further comprise allowing access to the registry of sensor devices.

A system for providing a registry of sensor devices, in one aspect, may comprise a database comprising the registry of sensor devices. A sensor registry server module may be operable execute on A processor and further operable to obtain a device, determine one or more information types returned by the device. The sensor registry server module may be further operable to determine one or more communication protocols used by the device for transmitting information. The sensor registry server module may be further operable to determine one or more encoding schemes used by the device to format the information. The sensor registry server module may be further operable to add the device to the registry of sensor devices including at least the one or more information types, the one or more communication protocols and the one or more encoding schemes. An application programming interface may allow access to the registry of sensor devices.

A computer readable storage medium or device storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A system and method are provided in one embodiment of the present disclosure for registry service of sensor devices, for querying of those sensor devices, and determining quality ratings of those sensor devices.

In one aspect, a system and method may provide a quality rating—a Q-factor—to any data source from sensor devices, e.g., non-human devices: the rating of a given device-based data source determined by comparing its responses to those of other devices returning equivalent or similar information. This rating can then be stored persistently (e.g., in a database) for later retrieval, both to gauge the accuracy of the given device's responses and for historical analysis of the device itself.

A source device or sensor is known to a registry of sensors, for example, as they are added or registered into the registry. The device may be known by its type (describing what variable it measures), model (manufacturer and model number) and an individual registration (similar to the International Mobile Station Equipment Identity (IMEI) for mobile phones). In addition, the registry knows (has information about) the location a specific sensor at the time of processing. A registry server may use the data collected by similar sources (type and or model) in the same location and crosscheck consistency of readings using one or more algorithms, for example, used in crowd sourcing methodologies. Other algorithms may be used.

With the multiplication and accumulation of cross-checks over time, the registry is enabled to provide a Q-factor related to a model of device or even to a specific device. For example, Q-factor values may be assigned as follows: Q-factor will be 0 if not yet fully assessed, 1 for highly reliable sources, 2 for average reliability, 3 for unreliable sources.

During an analytics process, presence of sources having Q-factor value of 1 (Q-factor 1 sources) would provide high confidence about the provide data. Sources having Q-factor value of 2 (Q-factor 2 sources) may be considered in absence of Q-factor 1 sources. Sources having Q-factor value of 3 (Q-factor 3 sources) may cause a server to generate a reliability warning to a user system.

Figure 1:
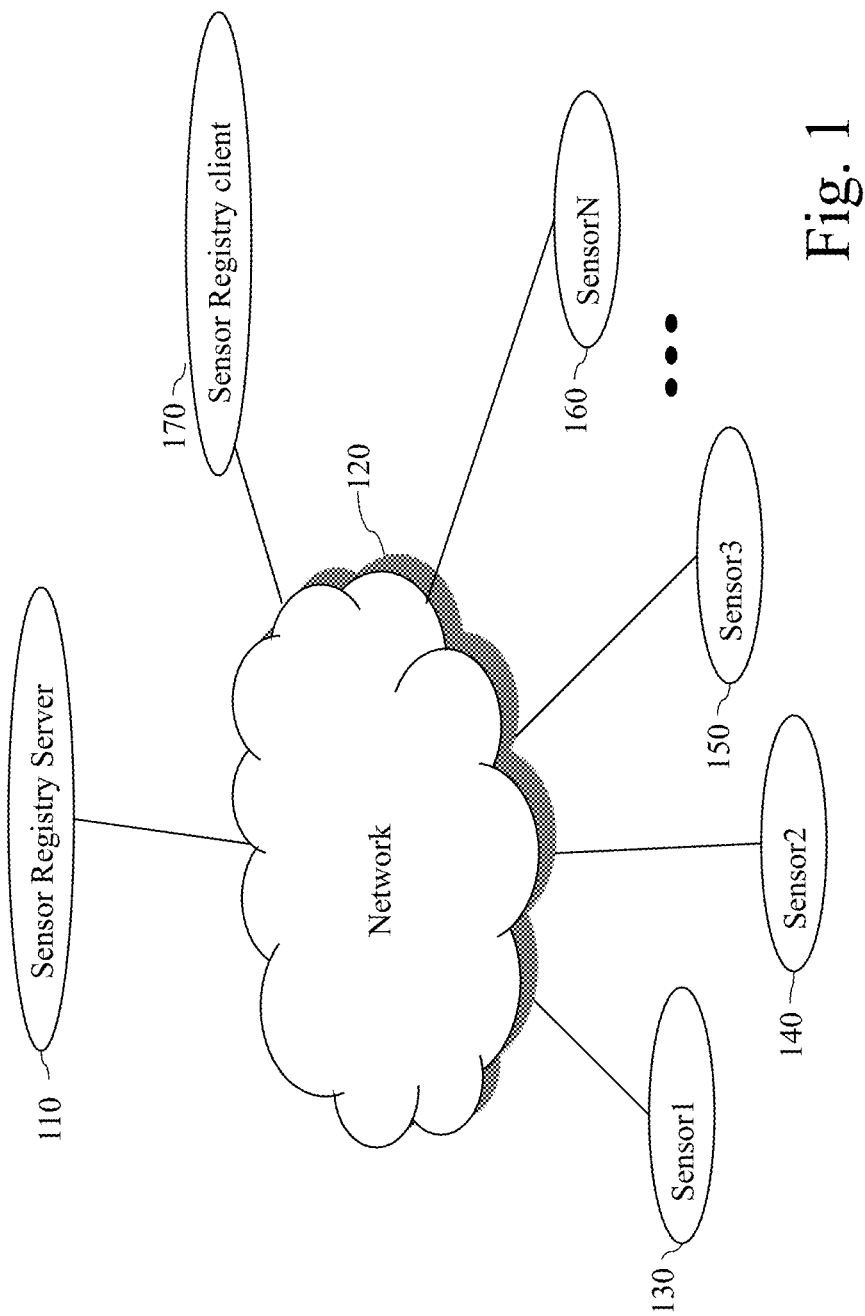
FIG. 1 illustrates a network topology showing sensor registry components in one embodiment of the present disclosure.

FIG. 1 illustrates a network topology showing sensor registry components in one embodiment of the present disclosure. A sensor registry server 110 may obtain information associated with a plurality of sensor devices (e.g., 130, 140, 150, 160), and provide sensor registry services as is more fully described below, such as storing a registry of sensor devices, determining their quality ratings, and selecting and providing one or more sensor devices that meet the requests of one or more clients (e.g., 170), for instance, via a network 120.

Examples of sensor devices may include but are not limited to one or more cameras (e.g., those in cell phones), one or more audio/video and/or other media processing devices, air quality detector or sensor (e.g., carbon dioxide sensor), and other sensor devices.

Sensor sourcing may comprise sourcing or obtaining data or information from a plurality of sensor devices, for example, image processing, which may be supervised or unsupervised or combination of supervised or unsupervised processing, such as labeling and classification, of images that may be obtained from sensor devices such as cameras in cell phones. Sensor sourcing may also include media processing, e.g., detecting traffic and/or road conditions such as near collisions, ice roads, trees near roads that may fall soon, and/or other condition detected by audio/video and/or other sensors that might be installed throughout the roads and/or streets in geographic locations. Sensor sourcing may also include obtaining information about air quality in a city or another location from a carbon dioxide detector or sensor, which may also be installed on locations in the city. Sensor sourcing generally sources information from sensors or such devices.

Data may be collected from a number of sensors, whose prior knowledge of reliability is not known. Requests made to those sensors to obtain the desired information may or may not produce accurate results. The sensor registry server in one embodiment of the present disclosure may store a registry of sensors, determine their quality ratings, and also provide to one or more clients those sensors that best produce the results needed by a client (or a requestor requesting sensor information).

Figure 2:
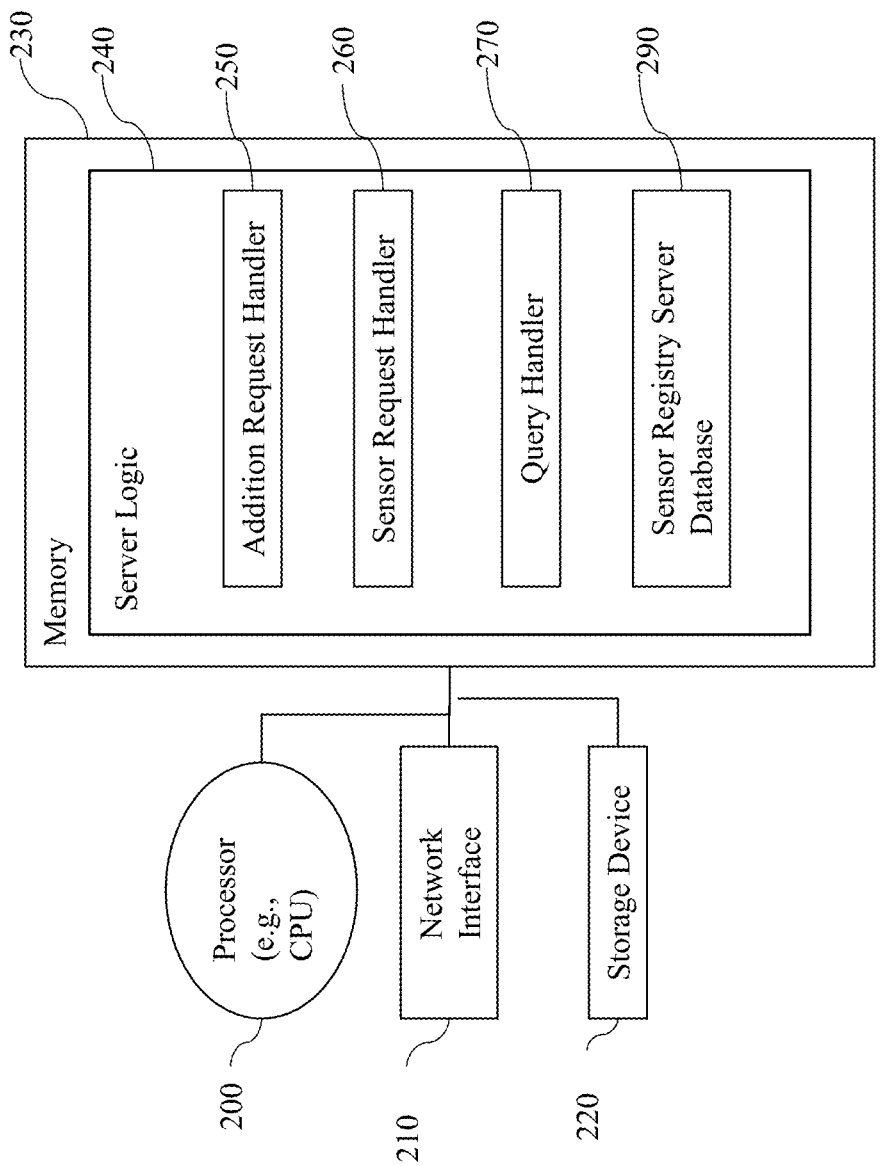
FIG. 2 is a block diagram illustrating a sensor registry server in one embodiment of the present disclosure.

FIG. 2 is a block diagram illustrating an example sensor registry server in one embodiment of the present disclosure, for example, a sensor registry server shown in FIG. 1 at 110. A sensor registry server may include one or more processors, for example, one or more central processing units that execute the sensor registry service methodologies as described herein. The sensor registry may comprise other types of processing units. A network interface 210 allows the sensor registry server to communicate with a variety of devices over a network. A storage device 220 may store data used and processed by the sensor registry server, including, for example, the information about a plurality of registered sensors. In another aspect, such information or data may be stored remotely from the server. A memory device 230 may store server logic 240, which may comprise an addition request handler 250 that handles adding or registering one or more new sensors into the sensor registry service, a sensor request handler 260 that handles requests for one or more sensors, a query handler 270 that handles queries and a sensor registry server database 290 application that handles storage and retrieval of data related to sensor devices. The server logic 240 may comprise machine or computer executable instructions.

Figure 3:
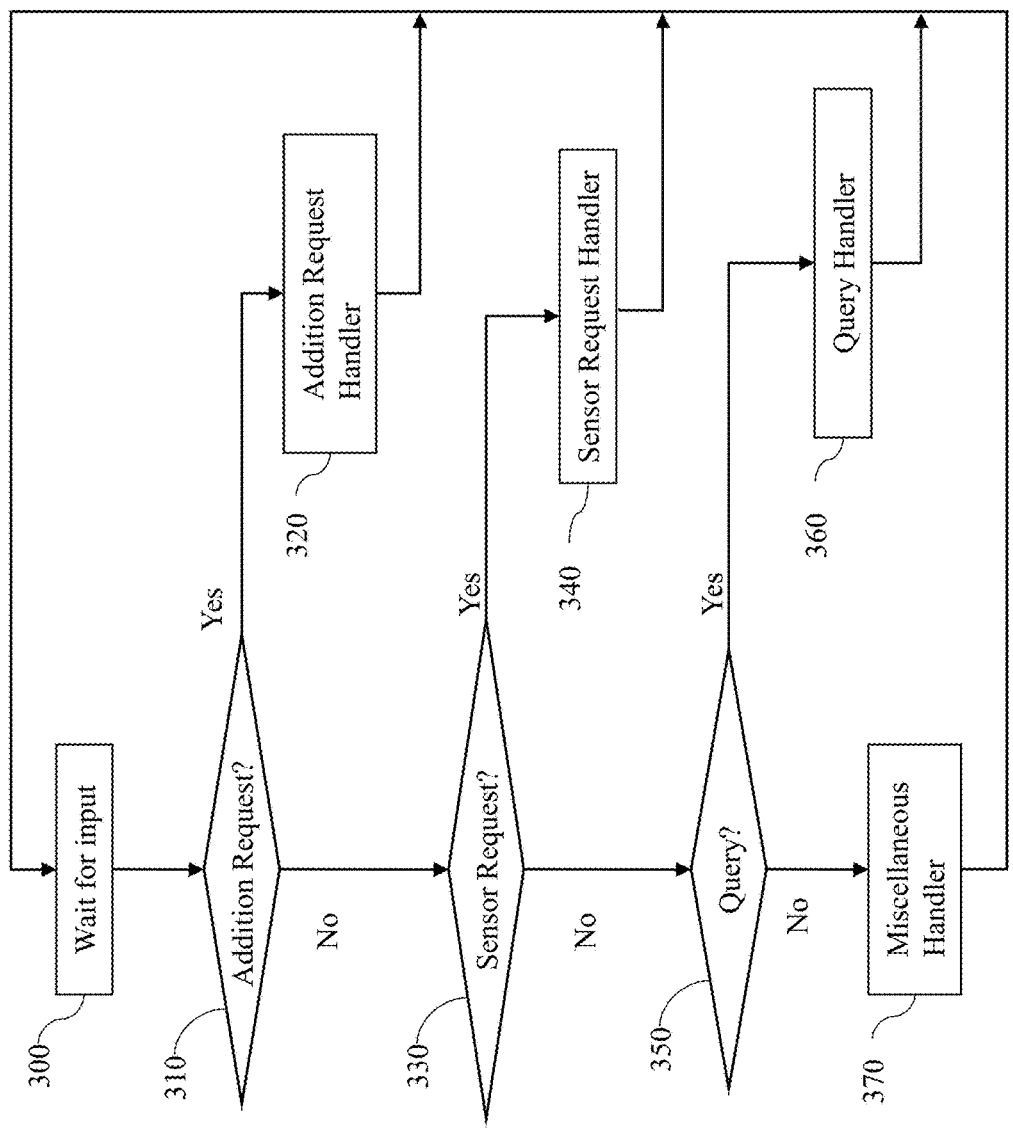
FIG. 3 is a flow diagram illustrating a logic control flow of a sensor registry server in one embodiment of the present disclosure.

FIG. 3 is a flow diagram illustrating a logic control flow of a sensor registry server in one embodiment of the present disclosure. At 300, the logic waits for input. At 310, it is determined whether the input is a request to add a sensor. If so, at 320, an addition request handler is invoked to add or register a new sensor into a sensor registry. The logic may then return to 300 to wait for the next input to be received. If at 310, if the input is not an addition request, at 330, it is determined whether the input is a request for a sensor. If so, at 340, a sensor request handler is invoked to respond to a request for one or more sensors. The logic may then return to 300 to wait for the next input to be received. At 330, if the input is not a sensor request, at 350, it is determined whether the input is for a query. If so, at 360, a query handler is invoked to query one or more sensors for information. The logic may then return to 300 to wait for the next input to be received. If the input is not for a query, a miscellaneous handler may be invoked at 370, for handling the input appropriately.

Figure 4:
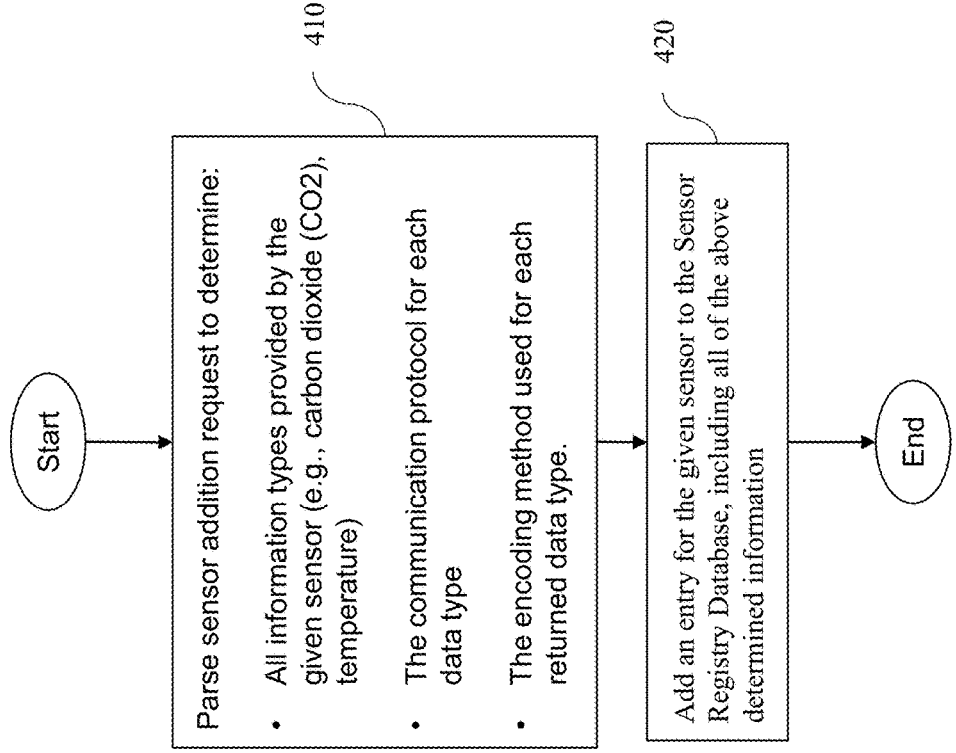
FIG. 4 is a flow diagram illustrating an addition request handler method in one embodiment of the present disclosure.

FIG. 4 is a flow diagram illustrating an addition request handler method in one embodiment of the present disclosure. The addition request handler may acquire information associated with a given sensor that is being added to the sensor registry. At 410, the input or sensor addition request may be parsed to determine all information types provided by the given sensor (e.g., a carbon dioxide sensor provides carbon dioxide level in the air, a thermostat provides temperature information, a camera (image sensor) provides image information, etc.). The input may be also parsed to determine the communication protocol for each data type (e.g., how the given sensor communicates its sensor data), and the encoding method used for each returned data type. At 420, an entry is created for the given sensor in the sensor registry database (e.g., FIG. 2 at 290), including the determined information, and stored.

Figure 5:
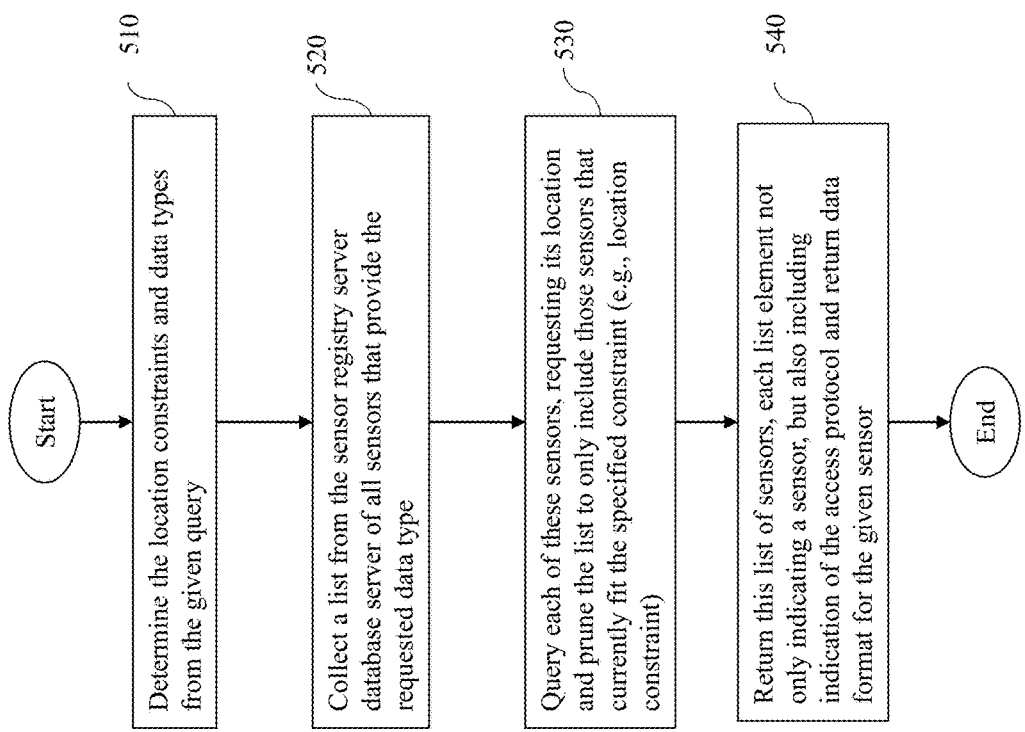
FIG. 5 is a flow diagram illustrating a sensor request handler method in one embodiment of the present disclosure.

FIG. 5 is a flow diagram illustrating a sensor request handler method in one embodiment of the present disclosure. The sensor request handler in one embodiment responds to requests (e.g., from a client device or application) to the sensor registry server for one or more sensor devices, e.g., all sensors returning a given type of data (e.g., carbon dioxide level in the air, temperature, traffic information), e.g., that match one or more given constraint such as a location constraint (e.g., location within 1 mile of location X, or location in city Y, country Z). At 510, the one or more location constraints and one or more data types being requested in the sensor request are determined. For example, the request message may be parsed to determine the information. At 520, a list of all sensors that provide the requested data type is collected from the sensor registry server database. At 530, each of the sensors in the list is queried to determine whether the sensor meets the given constraint. For example, each of the sensors may be queried, requesting its current location. For example, a message may be sent in real time to each of the sensors to determine the sensor's current location and/or other information or attributes associated with the sensor. The list of sensors is then pruned or filtered to only include those sensors that currently fit the specified one or more constraints, e.g., one or more specified location constraints. At 540, the sensors listed in the pruned or filtered list of sensors is returned to the requestor (e.g., a client application or device). The information returned to the requestor may include not only the list of sensors but also an indication of the access protocol and return data format for each of the sensors in the list of sensors. With such information, the requestor may directly communicate with those sensors for the needed or desired information from the sensors. In one embodiment of a method of the present disclosure, a reliability factor may be also returned as one of the several pieces of data associated with a given returned sensor. For instance, in addition to a given request specifying the type and location range of desired sensors, the request can also indicate a requested reliability factor (or range of acceptable reliability factors). Then, the method of the present disclosure in one embodiment may could prune the returned sensor based not only on type and current location, but also based on their reliability factor, returning only those which meet or surpass the requested reliability factor threshold or range.

Figure 6:
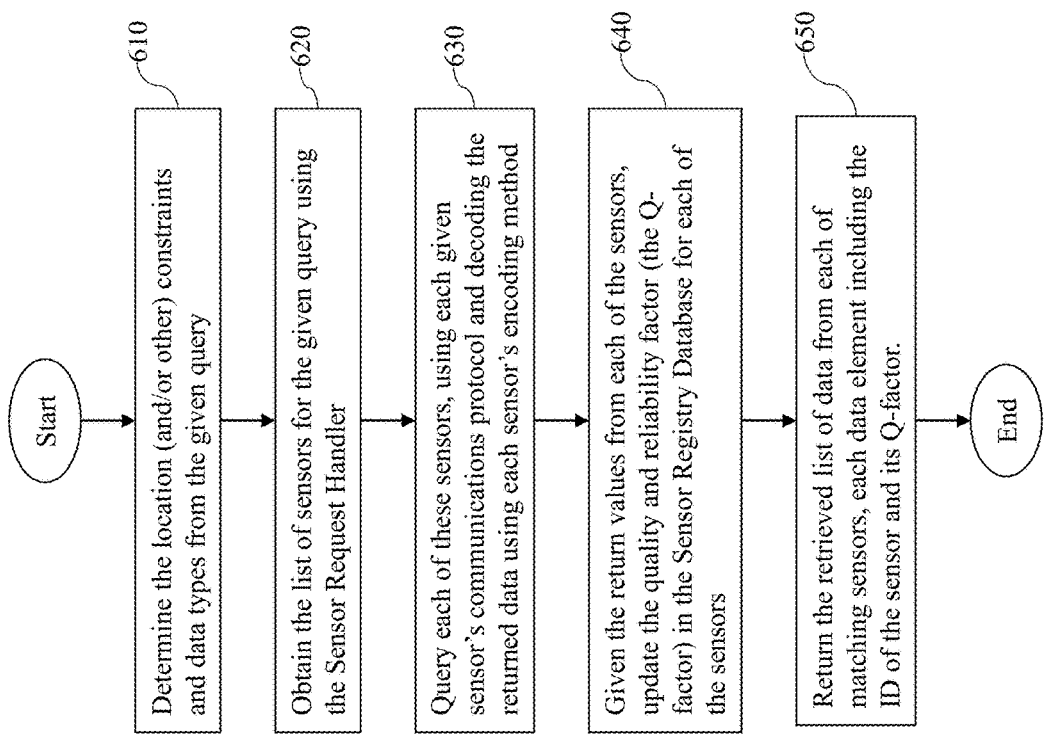
FIG. 6 is a flow diagram illustrating a query handler method in one embodiment of the present disclosure.

FIG. 6 is a flow diagram illustrating a query handler method in one embodiment of the present disclosure. A request for query queries an appropriate set of sensors for information. In one embodiment of the present disclosure, a given sensor's Q-factor indicates how well the given sensor's reading matches those of the other matching sensors making the same measurement. For example, the Q-factor can be incremented every time the sensor's reading approximates that of the other sensors, while being decremented when it does not. This continual incrementing allows a given high-quality sensor's Q-factor to reflect its superior quality. Once a given sensor has broken down and starts returning faulty data, e.g., due to age, the continual decrementing of the Q-factor corrects even a previously high Q-factor, to reflect the sensor's reduced measurement quality. At 610, one or more constraints (e.g., location constraints) and data types from a given query are determined. For example, the query request message may include the information regarding the data types (also referred to as information types) and one or more constraints that can be extracted from the message. At 620, a list or a set of sensors are obtained for the given query, for example, using a sensor request handler (e.g., described with reference to FIG. 5). At 630, the sensors in the list are queried, using respective communications protocols. The data returned by the sensors are decoded using a respective encoding method. At 640, given the return values from each of the sensors, the quality and reliability factor (Q-factor) is updated in the sensor registry database for each of the sensors. At 650, the data returned by each of the sensors is returned to the query requestor, including the identifier (ID) of the sensor and associated Q-factor.

Figure 7:
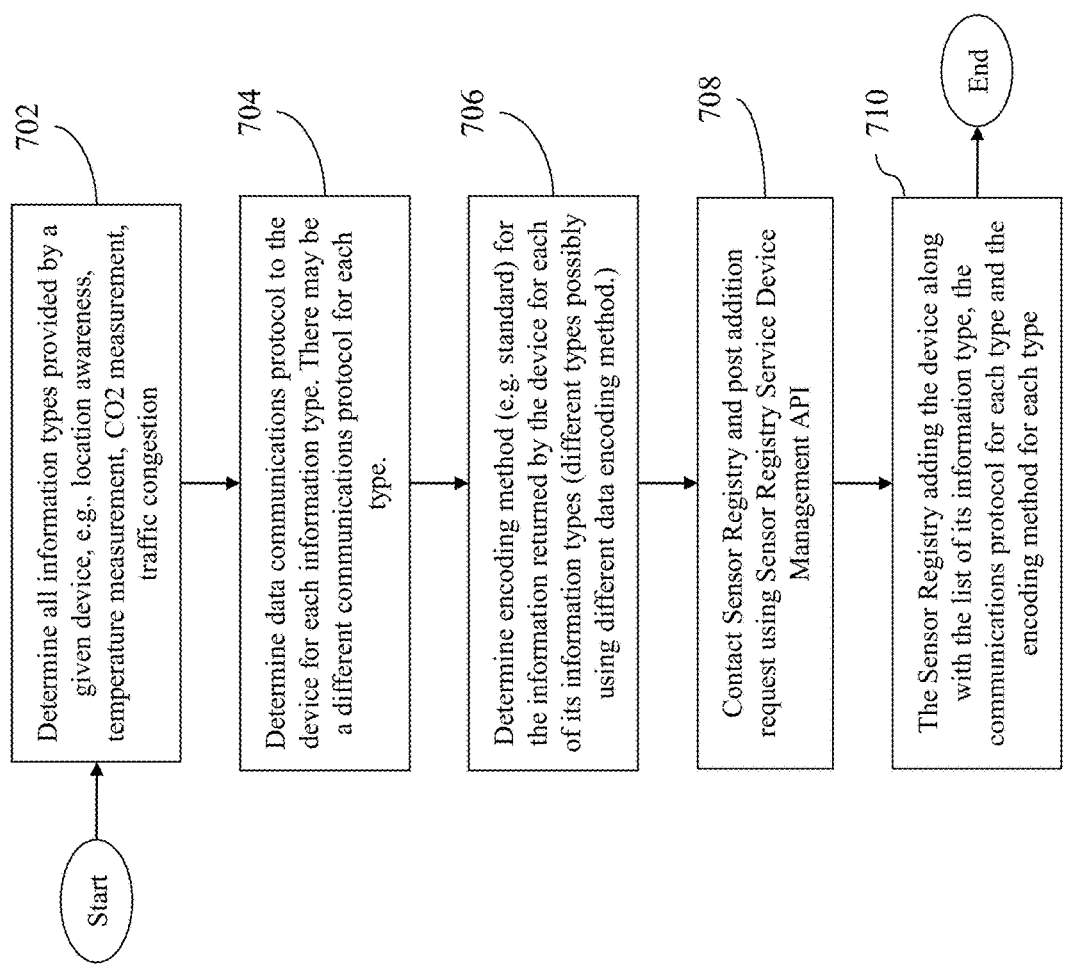
FIG. 7 is a flow diagram illustrating an overview of a sensor registry device addition method in one embodiment of the present disclosure.

FIG. 7 is a flow diagram illustrating an overview of a sensor registry device addition method in one embodiment of the present disclosure. At 702, all information types provided by a given sensor device, e.g., location awareness, temperature measurement, carbon dioxide measurement, traffic congestion, may be determined. At 704, a data communication protocol for communicating with the given sensor device is determined for each information or data type. There may be a different communications protocol for each data type. At 706, an encoding method or standard for the information returned by the give sensor device is determined for each type of information. Different types of information may use different data encoding method. At 708, a sensor registry is contacted, if not done already, and a request to add the given sensor device is posted to the sensor registry. In one embodiment of the present disclosure an application programming interface (referred to as a sensor registry service device management API) may be utilized to post a request to the sensor registry. At 710, the sensor registry adds the given sensor device along with the list of its information type, the communications protocol for each type and the encoding method for each type. The processing shown in FIG. 7 may be performed in a distributed manner. For example, the processing at 702, 704 and 706 may be performed at a different device than the sensor registry server implementing the sensor registry. Hence, for example, the processing at 702, 704 and 706 may be performed at a remote device, then the sensor registry server contacted for adding the given sensor device with the determined information.

Figure 8:
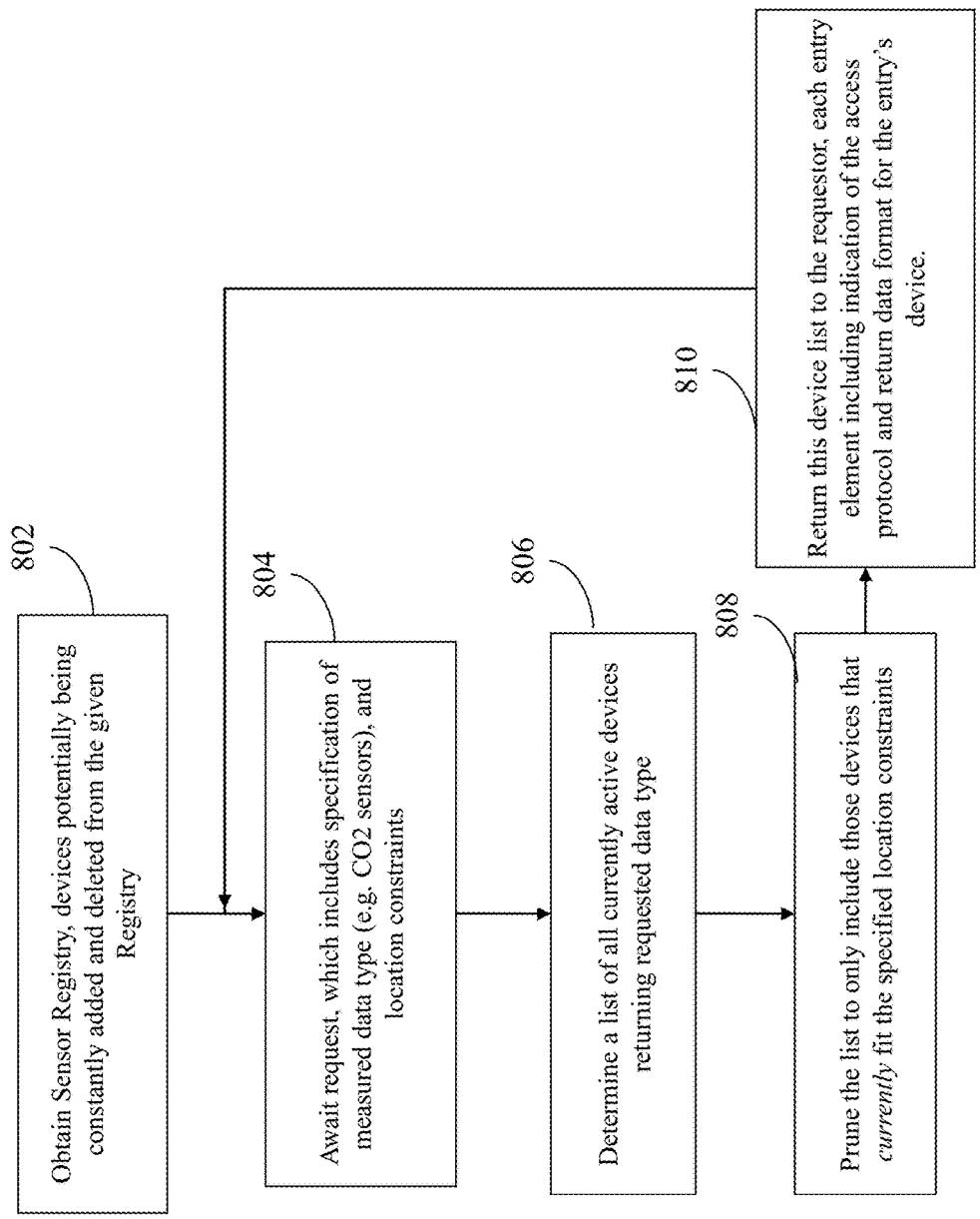
FIG. 8 is a flow diagram illustrating an overview of a sensor registry method in one embodiment of the present disclosure.

FIG. 8 is a flow diagram illustrating an overview of a sensor registry method in one embodiment of the present disclosure. At 802, a sensor registry is accessed. The sensor registry may include a plurality of sensor devices that are actively being added and deleted from the registry. At 804, a request is received. The request may include a specification of desired data type for measuring and one or more constraints such as a location constraint. At 806, a list of all currently active sensor devices from the sensor registry that can return the requested data type is determined. At 808, the list is further refined or filtered to include only those sensor devices that meet the specified one or more constraints (e.g., location constraint). At 810, the list of sensor devices resulting from the processing at 808 is returned to the requestor, including for each sensor device in the list, indicia of the access protocol and return data format.

Figure 9:
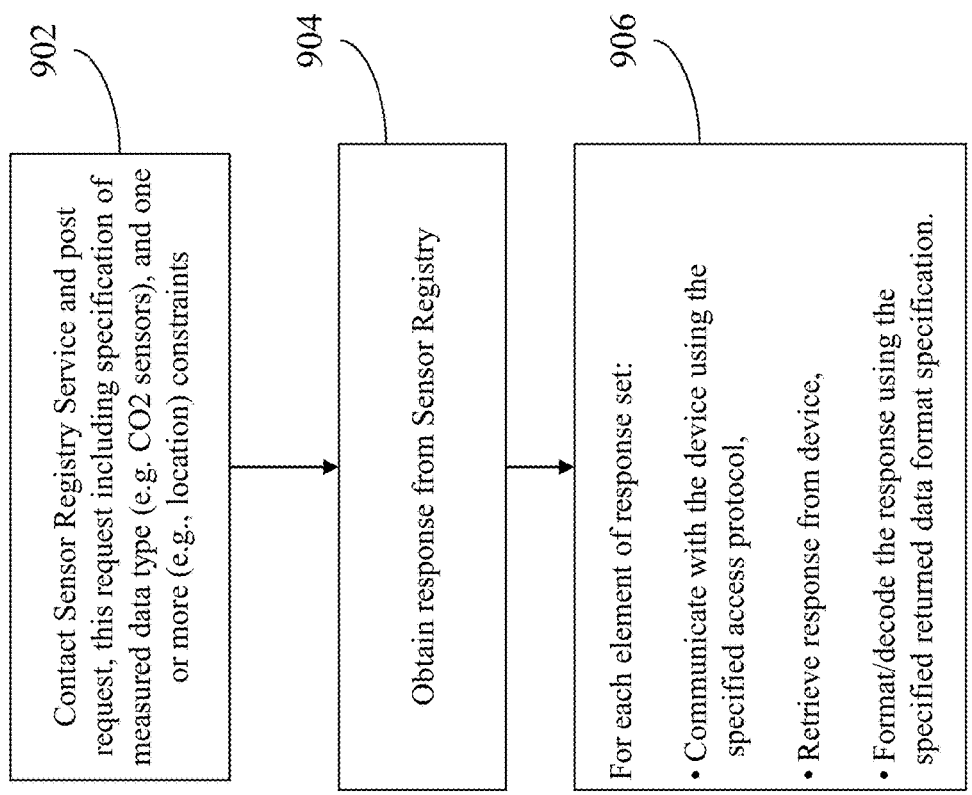
FIG. 9 is a flow diagram illustrating an overview of a sensor registry client method in one embodiment of the present disclosure.

FIG. 9 is a flow diagram illustrating an overview of a sensor registry client method in one embodiment of the present disclosure. At 902, a client device or application may contact a sensor registry service and post a request. The request may include a specification of data type to be measured and one or more constraints (e.g., location). At 904, response is received from the sensor registry service. The response contains a set of sensor devices and associated communication protocol and data encoding method for each sensor device in the set. At 906, the client device or application may communicate with the device using the specified access protocol, retrieve a response from the device (e.g., measured data), and format or decode the response using the specified returned data format specification.

A methodology of the present disclosure may allow for quickly identifying which one or more sensors are eligible to provide the expected data and how to access those one or more sensors for the expected data. For example, there may be number of sensor devices that detect and convey information. However, those sensor devices could be in motion, e.g., embedded or installed in a moving vehicle such as a car or a bus. Those sensors also could be currently unavailable (e.g., turned off or not ready for data collection). They also could not be located in the desired spatial location. They may not also collect the right type of data (carbon dioxide level in the air, carbon monoxide level in the air, and/or other types of data or information). In addition, different sensor devices may operate with different data formatting protocols, variable specifications and heterogeneous connectivity. An embodiment of the present disclosure may maintain a registry of sensors and identify those that provide the desired data at any one time, e.g., which one or more sensors to access to get the right data according to sensor characteristics and availability. Multitude of sensors, which may be present in a dynamic world of sensors, are managed in a sensor registry, for instance, in terms of volume, localization, availability and characteristics, and a user is enabled to access the right one(s) that meet the user's criteria.

Consider for example, a scenario in which it is desired to map carbon dioxide concentration or amount in the air in a geographical area. A requestor may interrogate a sensor registry server and ask for available carbon dioxide sensor device in the given area. The sensor registry server may determine a set of sensors that meet the requestor's criteria, e.g., those that detect carbon dioxide levels and are located in the given geographical area. The sensor registry server may return the list of sensor to the requestor along with the associated communication protocol and data encoding format. In this way, the requestor may directly query the returned sensors for the information. In another aspect, the sensor registry server may query the list of sensors, and return the information to the requestor. Yet in another aspect, the sensor registry server may redirect the query to those identified sensors while providing the specification associated with each of the sensors to the requestor. The readings may be sent in RAW mode to the requester who then reformats them to the appropriate format by applying a translation method based on the received specifications.

A system and method of the present disclosure in one embodiment may allow for facilitating the federation of heterogeneous devices, e.g., in the absence of a true standard, which may be used as the standard. In one embodiment, the server of the present disclosure may register every possible device, e.g., in response to a request by a requestor. A requestor may be a producer or manufacturer of the device or a user of the device, or another. A device may be registered with the server of the present disclosure, and an entry in the server (e.g., server's database) may include the following information:

Device identification (e.g., a media access control address (MAC address));

Device type: sensor—connected device (refrigerator—air conditioner (A/C)), e.g., one particular sensor which measures temperature that is integrated into a refrigerator to control the cooling system would have a device type of "refrigerator," while another temperature measuring sensor used in an automobile to provide a display of the current engine temperature would have a device type of "automobile";

Device subtype (barometric (BP) sensor—carbon dioxide (CO2) sensor, etc.), e.g., other sensor devices within the device;

Description of the data format produced by the sensor;

Interval of confidence and precision of the sensor (e.g., like in a scientific measurement device);

Addition entry field for additional characteristics to be added now or in the future.

In one embodiment, this information may be created by the device producer. Geo-location information may be input based on the location of the device detected.

Occurrence of errors may be common in a sensor sourcing system where tasks (requests for detecting information) are distributed or transmitted to multiple sensor devices (e.g., unidentified sensors). For example, some sensors might not be available, some sensors might not be identifiable, sensor crowd may be large (abundance of information, which may or may not be accurate), there may be no prior knowledge of the sensor's reliability, tasks may be distributed through open calls (no particular standard), there is no ability to condition rewards on correctness of sensor analyses and/or responses. For example, in a sensor sourcing system, batches of tasks may be distributed (electronically) to unidentified group of sensor, e.g., through broadcast for information. However, these "information piece-sensors" may provide possibly inaccurate data because, e.g., sensors may make random errors based on their own quality. To overcome such errors, a task may be assigned to multiple sensors. The final result may be an aggregation of multiple sensors' response for each task. For instance, estimation is performed after all the answers are obtained and the accuracy of information from different sensors may be based on the number of similar response from the sensors.

Because the information sensors provide can be unreliable, a sensor sourcer would need to devise one or more schemes to increase confidence in the data the sensors produce, e.g., by assigning each task multiple times and combining the answers in some way such as majority voting. In one embodiment, a method of the present disclosure may provide for achieving a level of reliability in responses from sensors, e.g., with minimum cost. In one embodiment of the present disclosure, a general model of such sensor sourcing tasks is considered. In one embodiment, the model is formulated as a problem of minimizing the total price (i.e., number of task assignments) that is to be paid to achieve a target overall reliability.

An embodiment of the method of the present disclosure may use an algorithm for deciding which tasks to assign to which sensors and for inferring correct answers from the sensors' replies. This algorithm may outperform majority voting and is asymptotically optimal through comparison to an oracle that knows the reliability of every sensor.

The problem may include several characteristics of sensor sourcing system: sensor devices are neither persistent nor identifiable; each batch of tasks is solved by a sensor device that may be completely new and that may be never seen again. Thus one cannot identify and reuse particularly reliable sensors. Nonetheless, by comparing one sensor device's answer to others' on the same question, it is possible to draw conclusions about a sensor's reliability, which can be used to weigh their answers to other questions in their batch.

Unlike many inference problems which make inferences based on a fixed set of signals, an algorithm used in the present disclosure can choose which signals to measure by deciding which questions to ask which sensors. The algorithm may assign tasks according to random regular bipartite graph schema, and the inference is based on an iterative algorithm.

Such algorithm may take the form of one used in crowd souring, but respect to sensors. A crowd sourcing algorithm is described in "Iterative Learning for Reliable Crowdsourcing Systems" by David R. Karger, Sewoong Oh, and Devavrat Shah, Department of Electrical Engineering and Computer Science, Massachusetts Institute of Technology, Cambridge, Mass. 02139. Portions of that disclosure are reiterated herein below as applied to sensors in the present disclosure. A crowd sourcing model may comprise a set of m tasks $\{t_i\}$ where i is an element of m (i∈[m]). Each task may be associated with an unobserved "correct" response, $s_i \in \{\pm 1\}$. Tasks are assigned to n sensors from the network of sensors ("sensor crowd"), $\{w_j\}$ where j∈[n]. When a task is assigned a sensor, the sensor possibly may produce an inaccurate response. Answer on task from a sensor may be annotated as $A_{ij} \in \{\pm 1\}$. The model may capture the diversity in sensor response reliability. Each sensor $w_j$ may be characterized by reliability $p_j \in [0, 1]$. Each sensor may make random errors in responding to a request. If a task $t_i$ is assigned to a sensor $w_j$ then, $$A_{ij} = \begin{cases} s_i & \text{with probability } p_j \\ -s_i & \text{with probability } 1 - p_j \end{cases},$$

and

-continued $A_{ij} = 0$ if $t_i$ is not assigned to $w_j$ $A_{ij}$ is independent of any other event given $p_j$.

In one embodiment of the present disclosure, it may be further assumed that the reliability of sensors $\{p_j\}$ where $j \in [n]$ are independent and identically distributed random variables with a given distribution on [0, 1]. One example is spammer-hammer model where each sensor is either a "hammer" with probability q or is a "spammer" with probability 1−q. A hammer answers all questions correctly, in which case $p_j=1$, and a spammer gives random answers, in which case $p_j=\frac{1}{2}$. Given this random variable $p_j$, a parameter is defined $q \in [0, 1]$, which captures the "average quality" of the crowd: $q \equiv E[(2p_j-1)^2]$, where E is function that returns an estimate of the overall quality of the results returned in response to each task.

A value of q close to 1 indicates that a large proportion of the workers are diligent, whereas q close to 0 indicates that there are many spammers in the crowd. However, q may be necessary to determine how many times a task should be replicated and how many iterations need to be run to achieve a level of reliability.

In one embodiment of a sensor sourcing model in the present disclosure, a taskmaster first decides which tasks should be assigned to which sensors, and then estimates the correct solutions $\{S_i\}$ where $i \in [m]$ once all the answers $\{A_{ij}\}$ are submitted. In a one-shot scenario, for example, in one embodiment, an inference algorithm of the present disclosure may utilize bipartite graph schema, in which all questions are asked simultaneously and then an estimation is performed after all the answers are obtained. Assigning tasks to nodes may involve designing a bipartite graph $G(\{t_i\}$ where $i \in [m] \cup \{w_j\}$ where $j \in [n]$, E) with m task and n sensor nodes, and E (different from above) being the set of all (task, reply) pairs Each edge (i, j) indicates that task $t_i$ was assigned to sensor $w_j$.

The iterative algorithm may operate on real-valued task messages $\{x_{i \to j}\}_{(i,j) \in E}$ and sensor messages $\{y_{j \to i}\}_{(i,j) \in E}$. The sensor messages may be initialized as independent Gaussian random variables. At each iteration, the messages may be updated according to an update rule, where $\delta_i$ is the neighborhood of $t_i$. A sensor message $\{y_{j \to i}\}$ represents a belief on how "reliable" the sensor j is, such that the final estimate is a weighted sum of the answers weighted by each sensor's reliability: $\hat{s} = \text{sign}(\Sigma_{j \in \delta_i} A_{ij} y_{j \to i})$.

For random (l, r)-regular bipartite graph based task assignments with the iterative inference algorithm, the probability of error decays exponentially in lq, up to a universal constant and for a broad range of the parameters l, r and q. With a reasonable choice of l=r and both scaling like (1/q) log (1/ε), the proposed algorithm achieves error less than ε for any $\varepsilon \in (0, \frac{1}{2})$.

Message passing in the iterative algorithm is represented as task message: $\{x_{i \to j}\}_{(i,j) \in E}$, and sensor message: $\{y_{j \to i}\}_{(i,j) \in E}$, which also represents sensor j's reliability on item i. Line 2 of the algorithm represents an update process: $x_{i \to j}^{(k)} \leftarrow \Sigma_{j' \in \delta_i \setminus j} A_{ij'} y_{j' \to i}^{(k-1)}$ computes the item likelihood to be positive. Tasks are more likely to be positive if reliable sensors say it is positive. $y_{j \to i}^{(k)} \leftarrow \Sigma_{i' \in \delta_j \setminus i} A_{i'j} x_{i' \to j}^{(k-1)}$ computes the reliability of users. Again, the above crowd sourcing algorithm, described in detail in "Iterative Learning for Reliable Crowdsourcing Systems" by David R. Karger, Sewoong Oh, and Devavrat Shah, Department of Electrical Engineering and Computer Science, Massachusetts Institute of Technology, Cambridge, Mass. 02139, provides another example method that can be used for calculating and updating sensors' quality factors, e.g., described with reference to FIG. 6.

Figure 10:
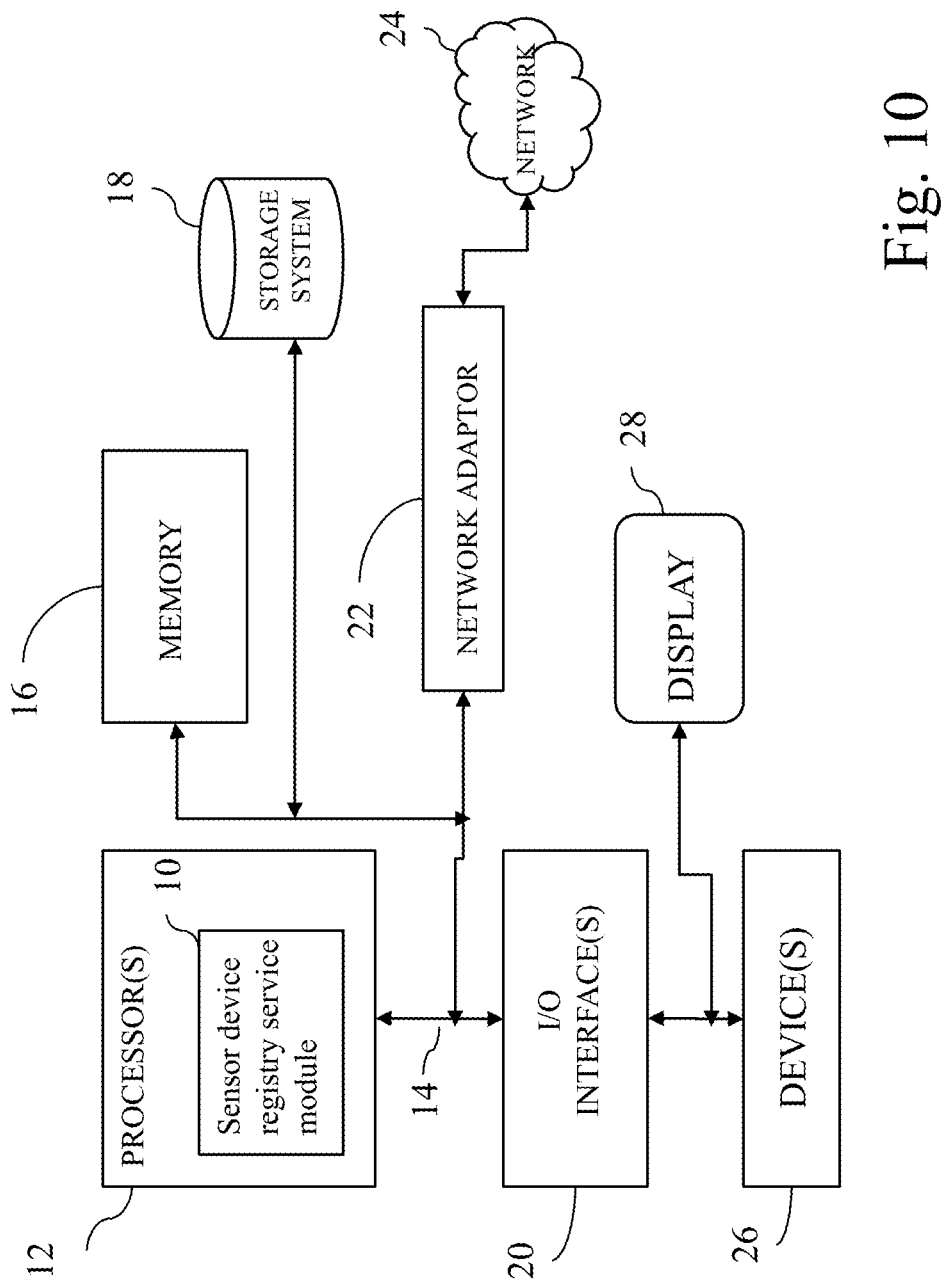
FIG. 10 illustrates a schematic of an example computer or processing system that may implement a sensor registry system in one embodiment of the present disclosure.

FIG. 10 illustrates a schematic of an example computer or processing system that may implement a sensor registry system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 10 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a sensor registry service module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for providing a registry of sensor devices, comprising:
   receiving an addition request from a device, the addition request comprising at least an information type returned by the device, a communication protocol used by the device for transmitting information associated with the information type, and an encoding scheme used by the device to format the information;
   adding the device to the registry of sensor devices including at least the information type returned by the device, the communication protocol and the encoding scheme;
   allowing access to the registry of sensor devices;
   transmitting, by a processor via a network, a request for information to a set of sensor devices registered in the registry of sensor devices that make same type of measurement requested in the information, using respective sensor device's communications protocols specified in the registry of sensor devices;
   receiving, by the processor, the information from the set of sensor devices; and
   updating in the registry of sensor devices, by the processor, a reliability factor of a sensor device in the set of sensor devices based on the information comprising measurements received from the set of sensor devices, the reliability factor indicating an accuracy of measurement data provided by the sensor device, the reliability factor of a sensor device incremented responsive to determining the measurement data provided by the sensor device matches to a degree sensor data provided by other sensor devices providing the same measurement type, the reliability factor of the sensor device decremented responsive to determining the measurement data does not match to the degree the sensor data provided by the other sensor devices providing the same measurement type; and
   assigning a reliability factor value to the sensor device, wherein a model type indicating manufacturer and model number of the sensor device is identified and the reliability factor value is assigned to other sensor devices having the same model type.

2. The method of claim 1, further comprising providing an application programming interface for interfacing with the registry of sensor devices for the information.

3. The method of claim 1, wherein the method is performed for a plurality of heterogeneous devices.

4. The method of claim 1, wherein the allowing access comprises:
- receiving a request from a requestor for a device that provide a specified type of information;
- determining a list of devices in the registry of sensors that provide the specified type of information; and
- returning the list of devices to the requestor.

5. The method of claim 4, wherein the returning further comprises returning the list of devices with at least the communication protocol and the encoding scheme associated with each of the devices in the list.

6. The method of claim 4, wherein the request further comprises a constraint associated with the device requested, and the determining the list of devices in the registry of sensors further comprises selecting at least one device in the registry that satisfy the constraint.

7. The method of claim 6, wherein the constraint comprises at least one location constraint, and the list of devices in the registry of sensors are queried in real-time to determine current location of each of the devices to determine at least one constraint that satisfies the at least one location constraint.

8. The method of claim 1, the reliability factor value comprising one of: not fully assessed; highly reliable, average reliable, and unreliable.

\* \* \* \* \*